(12) United States Patent
Buryak et al.

(10) Patent No.: US 9,268,762 B2
(45) Date of Patent: Feb. 23, 2016

(54) TECHNIQUES FOR GENERATING OUTGOING MESSAGES BASED ON LANGUAGE, INTERNATIONALIZATION, AND LOCALIZATION PREFERENCES OF THE RECIPIENT

(75) Inventors: Kirill Buryak, Sunnyvale, CA (US); Andrew Swerdlow, San Francisco, CA (US); Luke Hiro Swartz, San Francisco, CA (US); Cibu Chalissery Johny, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1058 days.

(21) Appl. No.: 13/351,031

(22) Filed: Jan. 16, 2012

(65) Prior Publication Data

US 2013/0185051 A1  Jul. 18, 2013

(51) Int. Cl.
*G06F 17/24* (2006.01)
*G06F 17/18* (2006.01)
*G06Q 10/10* (2012.01)
*G06F 17/28* (2006.01)

(52) U.S. Cl.
CPC ............ *G06F 17/248* (2013.01); *G06F 17/289* (2013.01); *G06Q 10/107* (2013.01); *G06Q 10/109* (2013.01)

(58) Field of Classification Search
CPC .... G06F 17/289; G06F 17/274; G06F 17/248
See application file for complete search history.

(56) References Cited

U.S. PATENT DOCUMENTS

| | | | |
|---|---|---|---|
| 5,148,541 A * | 9/1992 | Lee et al. | |
| 5,524,170 A * | 6/1996 | Matsuo et al. | 704/222 |
| 5,751,957 A * | 5/1998 | Hiroya et al. | 709/203 |
| 5,884,246 A * | 3/1999 | Boucher et al. | 704/2 |
| 5,960,382 A * | 9/1999 | Steiner | 704/2 |
| 6,088,699 A * | 7/2000 | Gampper et al. | |
| 6,161,082 A | 12/2000 | Goldberg et al. | |
| 6,623,529 B1 * | 9/2003 | Lakritz | 715/205 |
| 7,409,333 B2 | 8/2008 | Wilkinson et al. | |
| 7,720,922 B2 * | 5/2010 | Kulbaba | 709/206 |
| 7,933,930 B1 * | 4/2011 | Bargas et al. | 707/802 |
| 8,239,184 B2 * | 8/2012 | Nash et al. | 704/2 |

(Continued)

FOREIGN PATENT DOCUMENTS

EP        2261818 A1    12/2010

OTHER PUBLICATIONS

PCT International Search Report and Written Opinion dated Jun. 17, 2013 for PCT International Application No. PCT/US2013/021403 (10 pages).

*Primary Examiner* — Eric Yen
(74) *Attorney, Agent, or Firm* — Remarck Law Group PLC

(57) ABSTRACT

According to various embodiments of the disclosure techniques for generating outgoing messages are disclosed. The technique includes receiving a request to generate an outgoing message for a recipient and retrieving one or more recipient preferences of the recipient from a recipient preferences database. The one or more recipient preferences relate to customization of messages that are to be delivered to the recipient. The technique further includes retrieving a message template from a plurality of message templates stored in a message template database based on the request and the one or more recipient preferences. The technique also includes generating the outgoing message based on the retrieved message template and the one or more recipient preferences, and providing the outgoing message to the recipient.

18 Claims, 4 Drawing Sheets

(56) References Cited

U.S. PATENT DOCUMENTS

| | | | |
|---|---|---|---|
| 2001/0029455 A1* | 10/2001 | Chin et al. | 704/277 |
| 2002/0173946 A1* | 11/2002 | Christy | 704/2 |
| 2003/0115552 A1* | 6/2003 | Jahnke et al. | 715/536 |
| 2004/0034656 A1* | 2/2004 | Beesley | 707/104.1 |
| 2004/0102201 A1 | 5/2004 | Levin | |
| 2004/0153317 A1* | 8/2004 | Chamberlain | 704/219 |
| 2005/0246156 A1* | 11/2005 | Scanlan | 704/2 |
| 2006/0089832 A1* | 4/2006 | Ojanpera | 704/207 |
| 2006/0133585 A1* | 6/2006 | Daigle et al. | 379/88.06 |
| 2006/0152479 A1* | 7/2006 | Carlson et al. | 345/156 |
| 2007/0067154 A1* | 3/2007 | Ryan | 704/8 |
| 2007/0244853 A1* | 10/2007 | Schneider et al. | 707/3 |
| 2008/0046231 A1* | 2/2008 | Laden et al. | 704/8 |
| 2008/0288252 A1* | 11/2008 | Cerra et al. | 704/244 |
| 2009/0234633 A1 | 9/2009 | Chao-Suren et al. | |
| 2009/0271175 A1* | 10/2009 | Bodin et al. | 704/2 |
| 2009/0281829 A1* | 11/2009 | Hansen et al. | 705/2 |
| 2010/0017466 A1* | 1/2010 | Trauner | 709/203 |
| 2011/0307557 A1* | 12/2011 | Kadashevich et al. | 709/205 |
| 2012/0109998 A1* | 5/2012 | Patch et al. | 707/769 |
| 2013/0155891 A1* | 6/2013 | Dinan | 370/252 |

\* cited by examiner

US 9,268,762 B2

TECHNIQUES FOR GENERATING OUTGOING MESSAGES BASED ON LANGUAGE, INTERNATIONALIZATION, AND LOCALIZATION PREFERENCES OF THE RECIPIENT

FIELD

The present disclosure relates to techniques for generating personalized outgoing messages to a recipient based on preferences of the recipient, including language, internationalization, and localization preferences of a user.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many computer applications allow users to generate messages to send to one or more recipients. Many of these applications utilize message templates to generate the messages that are sent to the recipients. For example, a calendar application may allow a sender to invite a plurality of recipients to an event. The sender can designate a particular time, a particular place, and/or a particular event type, e.g., meeting or party. Based on this information and a message template corresponding to an "event invite," the calendar application can generate an outgoing message inviting the recipients to the event. The outgoing messages that are generated, however, are generated according to the settings of the application or based on the sender's preferences or practices.

SUMMARY

According to various embodiments of the disclosure, a computer-implemented technique for generating outgoing messages is disclosed. The technique includes receiving, at a message server having one or more processors, a request to generate an outgoing message for a recipient. The technique further includes retrieving, at the message server, one or more recipient preferences of the recipient from a recipient preferences database. The one or more recipient preferences relate to customization of messages that are to be delivered to the recipient. The technique further includes retrieving, at the message server, a message template from a plurality of message templates stored in a message template database based on the request and the one or more recipient preferences. The technique also includes generating, at the message server, the outgoing message based on the retrieved message template and the one or more recipient preferences, and providing, from the message server, the outgoing message to the recipient.

According to various embodiments of the disclosure, a computer-implemented system for generating outgoing messages is disclosed. The technique includes a recipient preferences database that stores recipient preferences of a plurality of message recipients. The recipient preferences of each one of the plurality of message recipients relate to customization of messages that are for the one message recipient. The technique further includes a message template database that stores a plurality of message templates. The technique also includes a message generation module that is configured to receive a request to generate an outgoing message for a recipient. The request indicates the recipient and message data for generating the outgoing message. The message generation module is further configured to retrieve one or more recipient preferences of the recipient from the recipient preferences database, and retrieve a message template from a message template database based on the request and the one or more recipient preferences. The message generation module is further configured to generate the outgoing message based on the retrieved message template and the one or more recipient preferences, and provide the outgoing message to the recipient.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
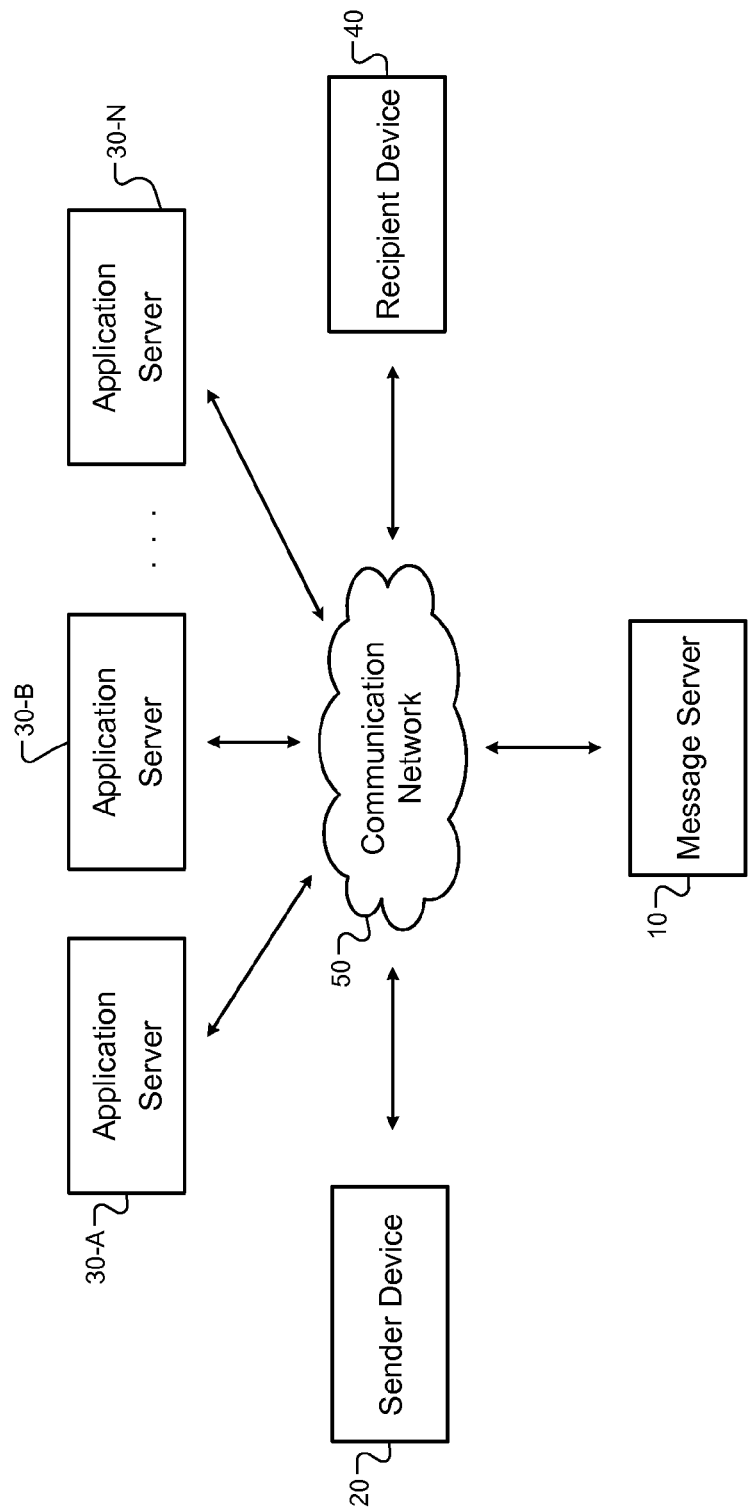
FIG. 1 is a drawing illustrating an environment for generating and providing personalized outgoing messages according to some embodiments of the present disclosure.

Referring to FIG. 1, an example environment for generating and providing personalized outgoing messages is illustrated. Many applications allow senders to send messages to one or more recipients. These applications may be executed at a sender device 20. As should be appreciated, a sender device 20 may be any computing device such as a laptop computer, desktop computer, a mobile telephone, a tablet computer, or gaming devices. Further, the applications may be executed at an application server, e.g., application server 30-A, 30-B, or, 30-N (herein referenced as application server 30). An application executed by the application server 30 can be accessed by a sender at the sender device 20 by, for example, a web-browser or a client application. It should be appreciated that the application server 30 can execute any type of application or cloud-based service, such as a calendar application, a social networking website, an accounting application, a notification application, or an eCard application.

The sender, from the sender device 20, can request that an outgoing message be sent to one or more recipients. In some embodiments, a request to generate an outgoing message for one or more recipients can be provided to a message server 10 by an application. The request to generate an outgoing message can be sent on behalf of the sender or on behalf of the application. The request can include a message type identifier identifying a type of message to be sent, a list of recipients, and message data that is particular to the outgoing message. For example, a request to generate a calendar invite may include a message type identifier indicating that the outgoing message is a calendar invite, a list of invitees that are to receive the invite, and message data particular to the invite such as a date, a time, a place, and an event type. Based on the request, the message server 10 can generate an outgoing message.

The message server 10 may store a plurality of message templates corresponding to one or more applications. A message template is a data structure that can be utilized to generate outgoing messages. A message template may include one or more template placeholders and a text portion. The message server 10 can generate an outgoing message by substituting message data received in the request in place of the template placeholders.

For example, a message template for a calendar application may be "{Hello, {RECIPIENT_NAME}, {SENDER_NAME} has invited you to a {EVENT_TYPE} at {LOCATION} on {DATE} at {TIME}." In this example, the template placeholders are {RECIPIENT_NAME}, {SENDER_NAME}, {EVENT_TYPE}, {LOCATION}, {DATE}, and {TIME}. When the message server 10 receives a request to generate an outgoing message, the message server 10 can retrieve a message template of a message type which corresponds to the message type identifier in the request. The message server 10 can generate the outgoing message by substituting message data provided in the request for the template placeholders of the retrieved message template. For example, the message server 10 can insert a name of the recipient, a name of the sender, a type of event, a place of the event, the date of the event, and/or the time of the event into the message template.

The message server 10 can be configured to determine recipient preferences for each of the recipients. The message server 10 can use the recipient preferences to generate the outgoing message. For example, the recipient preferences may designate a list of languages understood by the recipient (including a primary language of the recipient), a preferred date format of the recipient, a preferred currency of the recipient, and/or preferred measurement units of the recipient. Other recipient preferences may also include calendar preferences of the recipient, number formatting preferences of the recipient, time formatting preferences of the recipient, a timezone preference of the recipient, and a language dialect preference of the recipient. Based on the recipient preferences, the message server 10 can retrieve a message template having a text portion that is in the primary language of the recipient, and/or format the message data in accordance with the recipient preferences, e.g., a monetary amount can be displayed in the recipient's currency and a date can be displayed in the recipient's preferred date format.

Once an outgoing message is generated according to the recipient preferences, the outgoing message can be transmitted to a recipient device 40. Similar to the sender device 20, the recipient device 40 may be any personal computing device. Further, it should be appreciated that the outgoing message can be provided to the recipient device 40 in any suitable manner. For instance, the outgoing message may be provided as an email message, a message service (SMS) message, a multimedia messaging service (MMS) message, a notification, or in any other suitable format.

Figure 2:
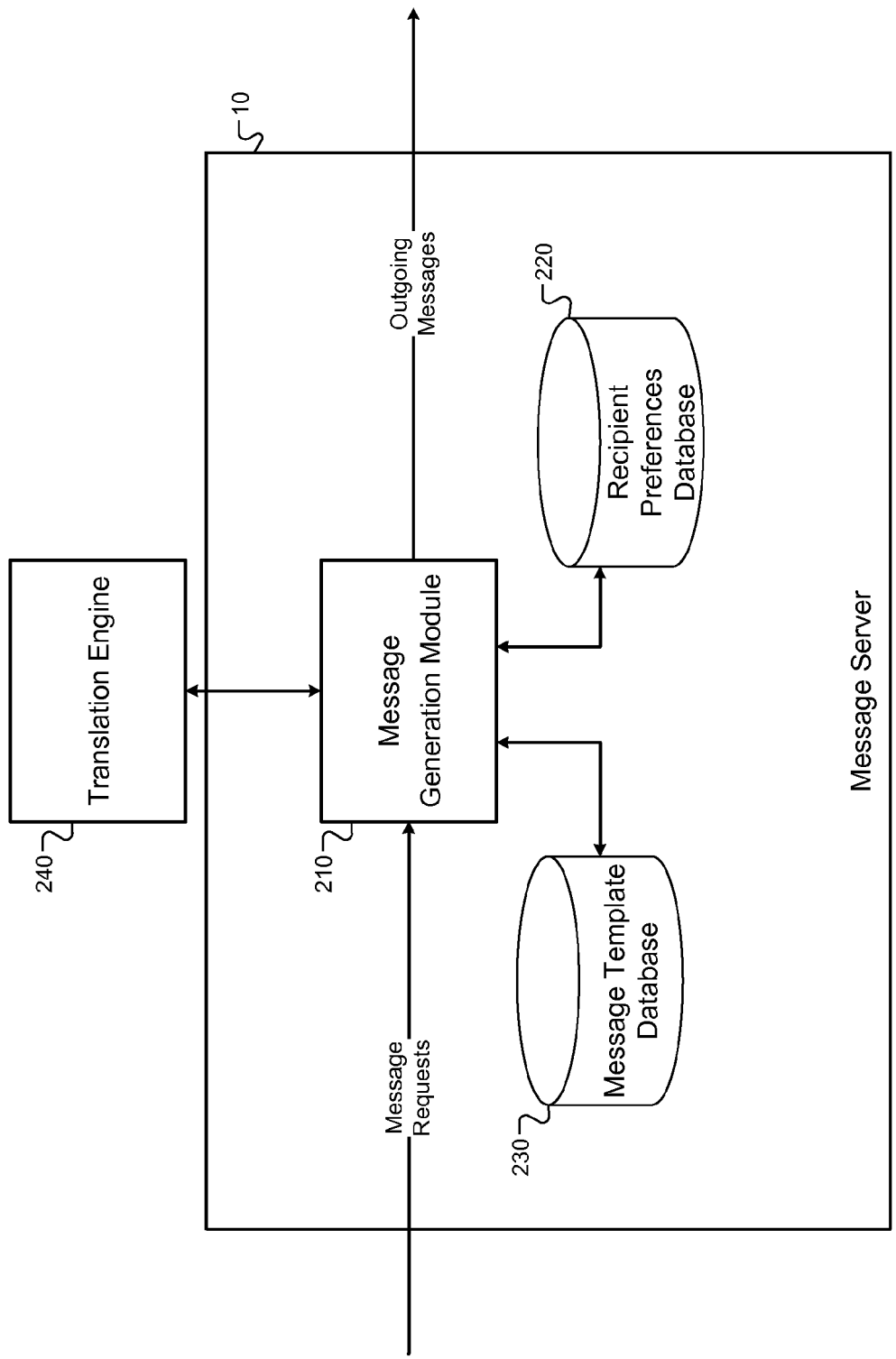
FIG. 2 is a block diagram illustrating example components of a message server according to some embodiments of the present disclosure.

Referring now to FIG. 2, an example message server 10 is illustrated. The message server 10 may include a message generation module 210, a recipient preferences database 220, and a message template database 230. Further, the message server 10 may include or may be in communication with a translation engine 240.

The message generation module 210 can receive requests to generate an outgoing message from one or more application servers 30 and/or a sender device 20. As discussed above, the request can include a message type identifier, a list of recipients, and message data. As mentioned, the message data may include any values that are used to generate the outgoing message. In some situations, the message data may further include additional text provided by the sender that is to be inserted into the outgoing message.

The message generation module 210 can determine the intended recipients of the message based on the request. For each intended recipient, the message generation module 210 can retrieve recipient preferences from the recipient preferences database 220. The recipient preferences database 220 stores recipient preferences for each of a plurality of recipients. It should be appreciated that a recipient can be any user, including the sender. Each recipient can provide one or more recipient preferences during a registration process or in a subsequent update. The recipient can provide recipient preferences, including the language list of the recipient, the primary language of the recipient, the currency preference of the recipient, the date format preference of the recipient, and the time format preference of the recipient. It is appreciated that some of the recipient preferences such as date format preferences or currency preference can be determined from the country or region of the recipient as an alternative to being specifically provided by the recipient. In some embodiments, the recipient preferences can be stored as a part of or with a user profile of the recipient. It should be appreciated that the recipient preferences database 220 can be indexed or accessed using a name of the recipient, an email address of the recipient, an id number of the recipient, or any other suitable manner.

The message generation module 210 can further retrieve a message template to utilize for generating the outgoing message. The message generation module 210 can retrieve the message template based on the request. As mentioned, in some embodiments the request may indicate a message type identifier or any other mechanism for identifying which message template to use. The message generation module 210 can retrieve a requested message template from the message template database 230 based on the message type identifier.

The message template database 230 may store a plurality of message templates corresponding to one or more applications. Furthermore, the message template database 230 may organize the plurality of message templates into one or more sets of message templates, wherein each set of message templates includes message templates of the same message type but in different languages. For example, the message template database 230 may store one or more sets of message templates that correspond to a calendar application, one or more sets of message templates that correspond to a social networking application, and one or more sets of message templates that correspond to an accounting application. Table I illustrates an example organization of the message template database 230 corresponding to the example provided above:

TABLE I

| Message Type ID | Calendar-1 (1-1) | Calendar-2 (1-2) | Social-1 (2-1) | Accounting-1 (3-1) |
|---|---|---|---|---|
| Default Language | English | English | English | English |
| Alternate Language | French | French | German | French |
| Alternate Language | Spanish | Spanish | Spanish | Spanish |
| Alternate Language | German | German | Dutch | |
| Alternate Language | Chinese | Chinese | Chinese | |
| . . . | . . . | . . . | . . . | . . . |

TABLE I-continued

| Message Type ID | Calendar-1 (1-1) | Calendar-2 (1-2) | Social-1 (2-1) | Accounting-1 (3-1) |
|---|---|---|---|---|
| Alternate Language | Korean | Korean | Japanese | |

In the example of Table I, the message template database has two sets of message templates corresponding to the calendar application, a set of message templates corresponding to the social networking application, and a set of message templates corresponding to the accounting application. A default message template may be in English, while each set of message templates has additional message templates in alternate languages. At each entry in the table, the message template database 230 may store a message template corresponding to the message type identifier, e.g., the first set of calendar message templates may have a message type identifier of 1-1, while the second set of calendar message templates may have a message type identifier of 1-2, and the language. Thus, in the example, the sets of message templates corresponding to the calendar application are in English, French, Spanish, German, Chinese, and Korean. Similarly, the set of message templates corresponding to the social networking application are in English, German, Spanish, Dutch, Chinese, and Japanese. As should be further appreciated from the example, the set of message templates corresponding to the accounting application are in English, French, and Spanish. Thus, in this example, if a recipient is to receive a message corresponding to message type identifier 1-1 and the recipient's primary language is French, the message generation module 210 can retrieve the message template corresponding to the message type identifier that is in French.

As should be appreciated from the foregoing, the message generation module 210 can retrieve a message template from the message template database 230 corresponding to the message type identifier and the recipient's primary language. If there are no message templates in the recipient's primary language, the message generation module 210 can select a message template in one of the other languages recited in the list of languages that are understood by the user. If there are no message templates corresponding to the message type identifier or in one of the languages that are understood by the recipient, then the message generation module 210 can retrieve a default message template in the default language, e.g., English.

Once the message generation module 210 has retrieved a message template, the message generation module 210 can generate the outgoing message based on the message data received in the request, the recipient preferences retrieved from the recipient preferences database, and the retrieved message template. As discussed above, the message template may include one or more template placeholders. The message generation module 210 can replace the template placeholders with the message data received in the request. As should be appreciated, the application requesting the outgoing message may be aware of the specific template placeholders used in the message templates corresponding to the application. Thus, message data can include the specific values for each of the template placeholders for the message template identified by the message type identifier. For example, if the message template is: "{Hello, {RECIPIENT_NAME}, {SENDER_NAME} has invited you to a {EVENT_TYPE} at {LOCATION} on {DATE} at {TIME}," the message data in the request may have values corresponding to the template placeholders: {RECIPIENT_NAME}, {SENDER_NAME}, {EVENT_TYPE}, {LOCATION}, {DATE}, and {TIME}. Thus, the message generation module 210 can substitute the values received in the message data into the message template to generate the outgoing message.

Further, the message generation module 210 may generate the outgoing message in accordance with the recipient preferences. For instance, if the recipient preference of date format is in the European format, e.g., "day MONTH year," the message generation module 210 can format any dates listed in the outgoing message in accordance with the recipient preferences of the recipient. Similarly, if the message data in the request includes monetary values in dollars and the recipient preference of currency is in Euros, the message generation module 210 can convert a monetary value in the provided currency, e.g., Dollars, to the recipient's preferred currency, e.g., Euros, and can insert the converted monetary value into the output message. As should be appreciated, the message generation module 210 may be in communication with a server that converts currency values, measurement values, or any other values which may be require conversion.

Additionally, the message generation module 210 may be configured to format specific values in the outgoing message template in accordance with the recipient values. In the example of a recipient preference for the date format, the message generation module 210 may have templates for different date formats. For example, depending on the recipient preferences of the recipient, the date Dec. 6, 2011 may be formatted as "6 December 2011," "6 DEC 2011," "12/6/2011," "12.06.2011," or in any other format that is used. The message generation module 210 can then substitute the values formatted in accordance with the recipient preferences in place of the template placeholders in the retrieved message template, thereby generating the outgoing message.

In some embodiments, the message data received in the request may include additional text that is to be included in the outgoing message. For example, in the example of a calendar invite to a party, the sender may include a message to be included in the outgoing message such as "No gifts please." As should be appreciated, the message templates corresponding to the calendar invite may include a field for the additional text, but the text portion of the message templates may not have the actual additional text included therein. In these situations, once the message generation module 210 has retrieved the message template that will be used to generate the outgoing message, the message generation module 210 can provide the additional text to the translation engine 240. The translation engine 240 translates the additional text from the language of the sender to the language of the retrieved message template and returns the translated text to the message generation module 210. For example, if the sender provided the additional text in English and the retrieved message template is in French, the message generation module 210 can have the translation engine 240 translate the additional text from English into French, and can insert the resultant translated text into the French message template to generate the outgoing message.

Similarly, some template placeholders may be in place of words that would require translation. For instance, if the template placeholder is for a location or an event type, the message data provided by the sender may require translation, e.g. common nouns, or transliteration, e.g., names or proper nouns. In these situations, the message generation module 210 may provide the message data that requires translation or transliteration to the translation engine 240, which returns the message data in the target language of the outgoing message.

The message generation module 210 can provide the outgoing message to the recipient. As was discussed above, the recipient can receive the outgoing message at the recipient device 40. The outgoing message can either be pushed to the recipient device 40 or the recipient device 40 may have to access the message server 10 or the application server 30 to obtain the outgoing message.

It should be appreciated that the techniques described above are provided for example only. Variations of the message server 10 are contemplated and are within the scope of this disclosure.

Figure 3:
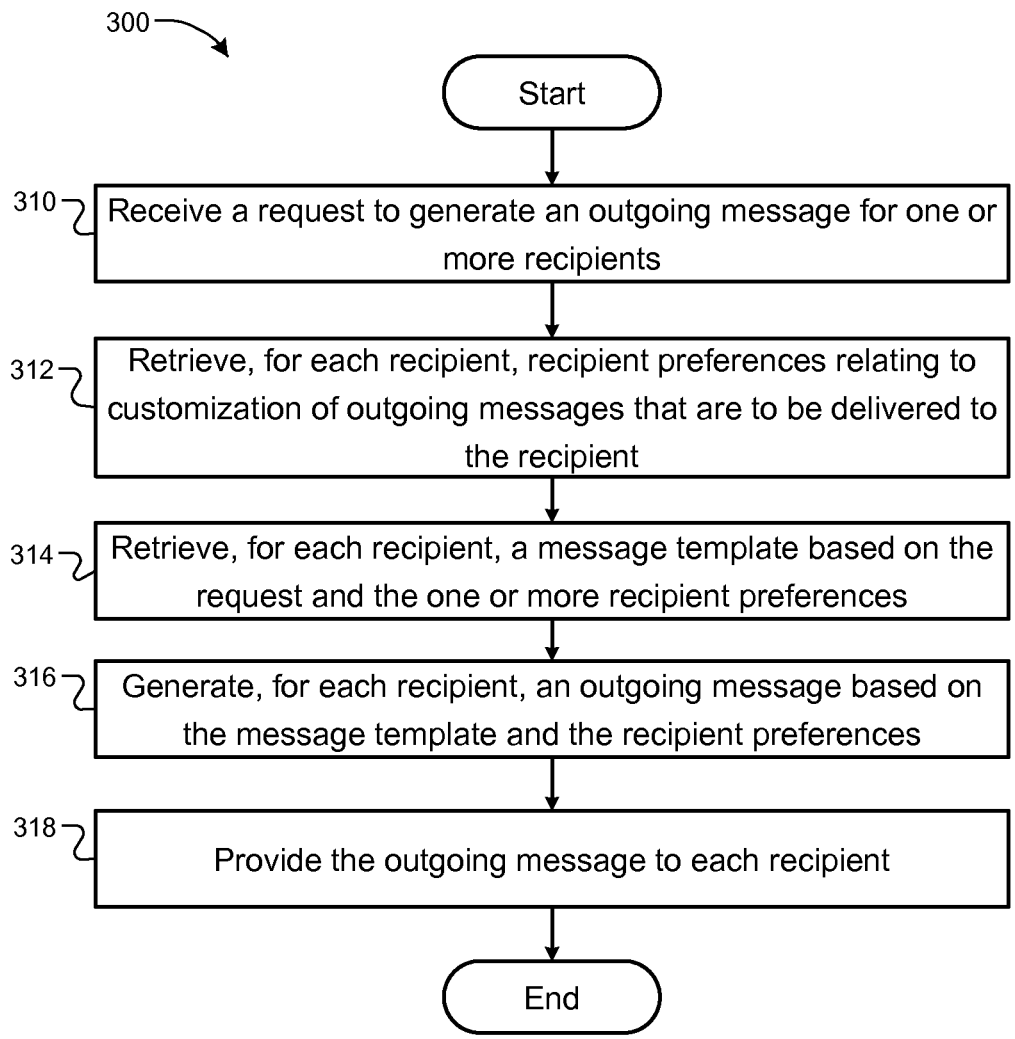
FIG. 3 is a flow chart illustrating an exemplary technique for generating outgoing messages according to some embodiments of the present disclosure.

Referring now to FIG. 3, an example technique 300 for generating an outgoing message is illustrated. At 310, the message generation module 210 can receive a request to generate an outgoing message to one or more recipients. As discussed above, the request may include a recipient indicator that indicates one or more intended recipients, a message type identifier, and message data. At 312, the message generation module 210 can retrieve, for each of the intended recipients, the recipient preferences of the recipient from the recipient preferences database 220. As described previously, the recipient preferences of a particular recipient can relate to customization of messages that are to be delivered to the particular recipient.

At 314, the message generation module 210 can retrieve, for each recipient, a message template from the message template database 230 based on the message type identifier received in the request and the recipient preferences of the recipient. Namely, the message generation module 210 can retrieve the message template based on the list of languages understood by the recipient, including the primary language of the recipient. As will be described in greater detail below, the message generation module 210 can retrieve a message template that is in the primary language of the recipient, in another language understood by the recipient, or in a default language.

At 316, the message generation module 210 can generate outgoing messages based on the retrieved message templates. As discussed above, the message templates may include template placeholders that represent values that can be represented in different formats or units. The message generation module 210 determines recipient preferences regarding how each recipient prefers the values to be displayed, e.g., preferred date format or preferred currency. The message generation module 210 can generate the values that are to replace the template placeholders in accordance with the recipient preferences. The message generation module 210 can then substitute the values for the template placeholders, thereby generating the outgoing messages for each recipient. At 318, the message generation module 210 can provide the outgoing messages to the one or more recipients.

As discussed in greater detail above, the request may indicate more than one recipient. It should be appreciated that the foregoing technique 300 may be repeated for each recipient indicated in the request. Further, variations of the technique 300 are contemplated and are within the scope of this disclosure.

Figure 4:
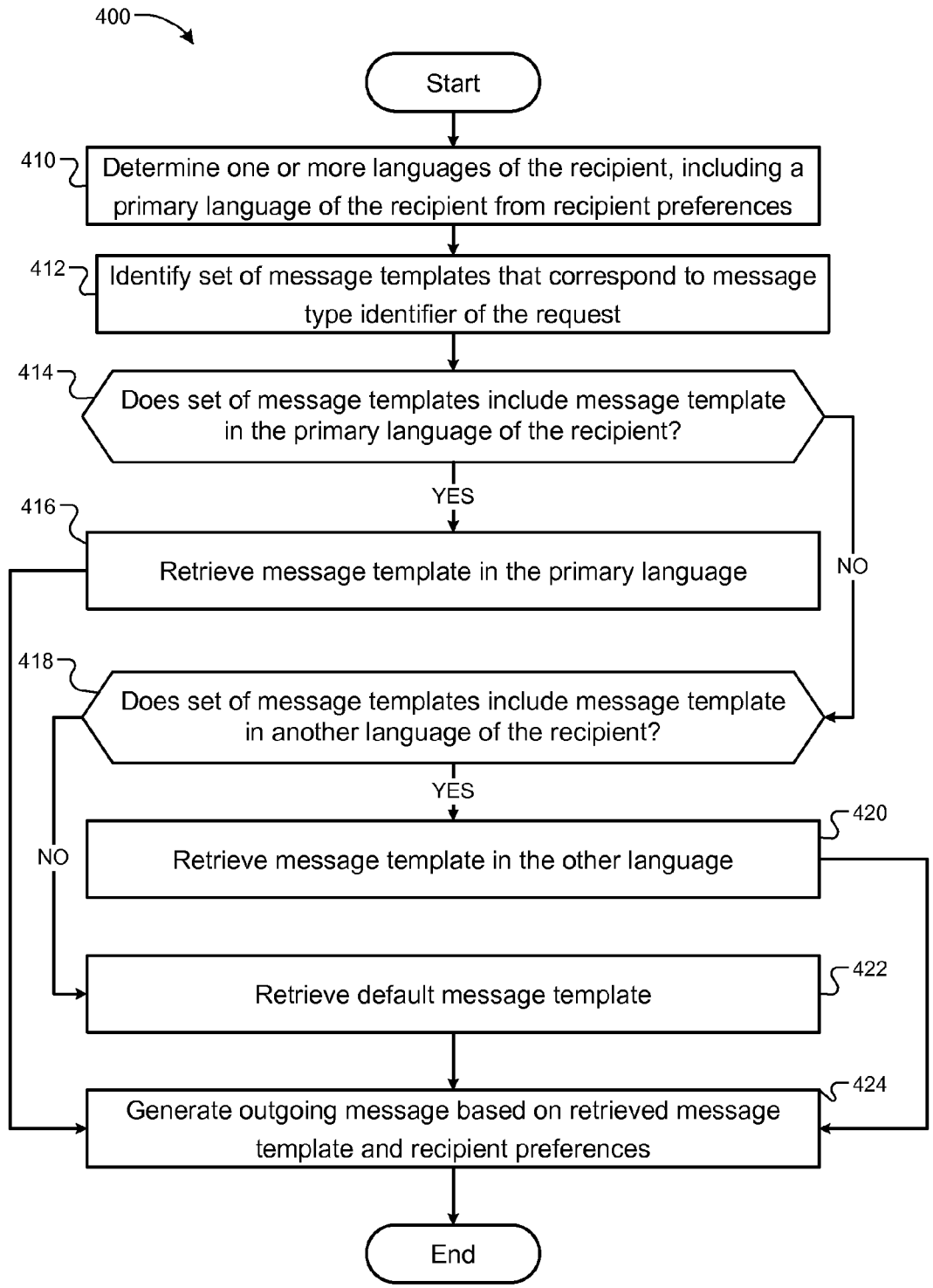
FIG. 4 is a flow chart illustrating an exemplary technique for selecting a message template.

Referring now to FIG. 4, an example technique 400 for selecting a message template from a plurality of message templates is illustrated. As discussed above, a request to generate an outgoing message can be provided to the message generation module 210, which retrieves the recipient preferences of the recipient based on the request. At 410, the message generation module 210 can determine one or more languages of the recipient from the recipient preferences, including the primary language of the recipient.

At 412, the message generation module 210 can identify a set of message templates that correspond to the message type identifier included in the request. As discussed above, the message template database 230 may include a plurality of message templates that correspond to one or more applications. Within the plurality of message templates, the message template database 230 stores one or more sets of message templates. Each set of message templates corresponds to a different message type and includes one or more message templates in one or more different languages. For example, a set of message templates corresponding to a social networking site may include different message templates in a plurality of different languages alerting the recipient that a user has added them to their network. For example, the set of message templates may include an English message template, e.g., "{{PERSON_NAME} has added you to their network.}}," and a Dutch message template, e.g., "{{PERSON_NAME} heeft toegevoegd aan hun network.}}." It should be appreciated the example message templates would correspond to the same message type, and thus, can share the same message type identifier. Accordingly, the message generation module 210 can identify the set of message templates corresponding to the message type identifier received in the request.

At 414, the message generation module 210 can determine whether any of the message templates in the identified set of message templates is in the primary language of the recipient. If there is a message template in the set of message templates that is in the primary language of the recipient, that message template is retrieved from the message template database 230, as shown at 416. If there are no message templates in the set of message templates in the primary language of the recipient, the message generation module 210 can determine whether there are any message templates in the set of message templates that are in another language understood by the recipient, as shown at 418. If so, the message template in the other language is retrieved from the message template database 230, as shown at 420. If there are no message templates in a language that is understood by the recipient, a default message template can be retrieved from the message template database 230, as shown at 422.

At 424, the message generation module 210 can generate the outgoing message based on the retrieved message template and the recipient preferences. As described above, the message generation module 210 can format specific values received in the message data in accordance with the recipient preferences of the recipient.

It is appreciated that the foregoing technique 400 is provided for example only and not intended to be limiting. Variations of the technique 400 are contemplated and are within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:

receiving, by a message server and from a sender computing device, a request to generate, for each of one or more recipients, an outgoing message, wherein the request identifies the one or more recipients and the request includes, for the outgoing message that is to be generated, only (i) a message type identifier identifying an outgoing message type and (ii) message data to be used in the generating of the outgoing message, wherein the message data includes both non-language-specific values and a text in a source language; and in response to receiving the request to generate, for each of the one or more recipients, the outgoing message:
  a) retrieving, by the message server and from a recipient preferences database, at least two recipient preferences that each correspond to a particular recipient of the one or more recipients, the at least two recipient preferences (1) relating to customization of messages that are to be delivered to the particular recipient and (2) including (A) one or more languages understood by the particular recipient and (B) at least one of:
    (i) a date format preference of the particular recipient,
    (ii) a measurement unit preference of the particular recipient,
    (iii) a currency preference of the particular recipient,
    (iv) a number formatting preference of the particular recipient,
    (v) a time formatting preference of the particular recipient,
    (vi) a time-zone preference of the particular recipient, and
    (vii) a language dialect preference of the particular recipient;
  b) based on the message type identifier and the one or more languages understood by the particular recipient, retrieving, by the message server, from a plurality of application-specific message templates, which are each stored in a message template database, a message template, wherein the retrieved message template is associated with a target language that is one of the one or more languages understood by the particular recipient, and wherein the target language is different than the source language;
  c) using the retrieved message template, the message data, and the at least two recipient preferences corresponding to the particular recipient, generating, by the message server, the outgoing message by:
    inserting the non-language-specific values into one or more value locations of the outgoing message, wherein the one or more value locations are specified by the retrieved message template,
    obtaining a translated text by obtaining a translation, from the source language to the target language, of the text in the source language, and
    inserting the translated text into one or more text locations, wherein the one or more text locations are specified by the retrieved message template; and
  d) providing, by the message server to a recipient computing device, the generated outgoing message, wherein the recipient computing device is associated with the particular recipient, wherein receipt of the generated outgoing message causes the recipient computing device to (i) obtain a displayable message by rendering the generated outgoing message and (ii) display, on a display of the recipient computing device, the displayable message, wherein the plurality of application-specific message templates include a plurality of sets of application-specific message templates associated with a plurality of types of applications, respectively, and wherein each set of the plurality of sets of application-specific message templates is associated with (i) a different application than a remainder of the plurality of sets of application-specific message templates and (ii) a different set of languages than the remainder of the plurality of sets of application-specific message templates.

2. A computer-implemented method, comprising:
receiving, by a message server and from a sender computing device, a request to generate, for a first recipient, an outgoing message, wherein the request identifies the first recipient, and wherein the request includes message data comprising (i) non-language-specific values and (ii) text in a source language; and in response to receiving the request to generate, for the first recipient, the outgoing message:
  retrieving, by the message server and from a recipient preferences database, one or more first recipient preferences, the one or more first recipient preferences relating to customization of messages that are to be delivered to the recipient, wherein the one or more first recipient preferences include one or more first languages understood by the first recipient, wherein the one or more first languages understood by the first recipient include a primary language of the first recipient, and wherein the primary language of the first recipient is different than the source language;
  based on the message data and the one or more first recipient preferences, retrieving, by the message server and from a plurality of application-specific message templates, which are each stored in a message template database, a first message template, wherein the retrieved first message template is associated with the primary language of the first recipient;
  using the retrieved first message template, the message data, and the one or more first recipient preferences, generating, by the message server, a first outgoing message by:
    inserting the non-language-specific values into one or more value locations of the first outgoing message, wherein the one or more value locations are specified by the retrieved first message template,
    obtaining a translated text by obtaining a translation, from (i) the source language to (ii) the primary language of the first recipient, of the text in the source language, and
    inserting the translated text into one or more text locations of the first outgoing message, wherein the one or more text locations are specified by the retrieved message template; and
  providing, by the message server to a first recipient computing device, the generated first outgoing message, wherein the first recipient computing device is associated with the first recipient, wherein receipt of the generated first outgoing message causes the first recipient computing device to (i) obtain a displayable message by rendering the generated first outgoing message and (ii) display, on a display of the first recipient computing device, the displayable message, wherein the plurality of application-specific message templates include a plurality of sets of application-specific message templates associated with a plurality of types of applications, respectively, and wherein each set of the plurality of sets of application-specific message templates is associated with (i) a different application than a remainder of the plurality of sets of application-specific message templates and (ii) a different set of languages than the remainder of the plurality of sets of application-specific message templates.

3. The method of claim 2, wherein the retrieving, by the message server and from the plurality of message templates that are each stored in the message template database, of the retrieved first message template further comprises:
  determining, by the server, whether any of the plurality of message templates stored in the message template database are associated with the primary language of the first recipient; and
  when a first particular message template of the plurality of message templates is determined to be associated with the primary language of the first recipient, obtaining, by the server, the retrieved first message template by retrieving the first particular message template from the message template database.

4. The method of claim 3, further comprising:
  when (i) none of the plurality of message templates are associated with the primary language of the first recipient and (ii) the one or more first languages understood by the first recipient include at least two first languages understood by the first recipient, determining, by the server, a non-primary language of the first recipient by selecting another first language from the at least two first languages understood by the first recipient;
  determining, by the server, whether any of the plurality of message templates stored in the message template database are associated with the non-primary language of the first recipient; and
  when a second particular message template of the plurality of message templates associated with the non-primary language of the first recipient, obtaining, by the server, the retrieved first message template by retrieving the second particular message template from the message template database.

5. The method of claim 3, wherein:
  the request further includes a message type identifier identifying a type of the outgoing message, and
  the plurality of message templates includes a set of message templates corresponding to the message type identifier, such that each message template in the set of message templates is in a different language relative to each other.

6. The method of claim 2, wherein the one or more first recipient preferences include at least one of a date format preference of the first recipient, a measurement unit preference of the first recipient, and a currency preference of the first recipient.

7. The method of claim 2, wherein:
  the request is received from a first application executing at the sender computing device, the first application being one of a plurality of different applications,
  each application of the plurality of different applications has a different set of message templates in the plurality of message templates corresponding thereto, and
  the retrieving of the retrieved first message template is further based on the first application executing at the sender computing device.

8. The method of claim 2, wherein the request indicates a plurality of recipients, wherein the plurality of recipients includes the first recipient, and wherein each of a remainder of the plurality of message recipients has one or more recipient preferences corresponding thereto.

9. The method of claim 8, further comprising, for a second recipient of the plurality of recipients:
  retrieving, by the message server and from the recipient preferences database, one or more second recipient preferences that each correspond to the second recipient;
  based on the message data and the one or more second recipient preferences, retrieving, by the message server and from the message template database, a second message template;
  using the retrieved second message template, the message data, and the one or more second recipient preferences, generating, by the server, a second outgoing message; and
  providing, by the server to a second recipient computing device, the generated second outgoing message, wherein the second recipient computing device is associated with the second recipient.

10. The computer-implemented method of claim 2, wherein the request is generated by the sender computing device and by a non-email application.

11. The computer-implemented method of claim 10, wherein the non-email application is a calendar application or a social networking application.

12. A computer system, comprising:
  a recipient preferences database configured to store sets of recipient preferences for each of a plurality of message recipients, wherein each set of recipient preferences relates to customization of messages for a corresponding recipient of the plurality of recipients, wherein each set of recipient preferences includes one or more languages understood by its corresponding recipient of the plurality of recipients, and wherein, for each set of recipient preferences, its one or more languages includes a primary language of its corresponding recipient of the plurality of recipients;
  a message template database configured to store a plurality of application-specific message templates; and
  one or more processors configured to:
    i) receive, from a sender computing device, a request to generate, for a first recipient of the plurality of recipients, an outgoing message, wherein the request identifies the first recipient, wherein the request includes message data for the outgoing message that is to be generated, and wherein the message data includes (a) non-language-specific values and (b) text in a source language,
    ii) retrieve, from the recipient preferences database and for the first recipient, one or more first recipient preferences, the one or more first recipient preferences including one or more first languages understood by the first recipient, wherein the one or more first languages understood by the first recipient include a primary first language of the first recipient,
    iii) based on the message data and the one or more first recipient preferences, retrieve, from the message template database, a first message template,
    iv) using the retrieved first message template, the message data, and the one or more first recipient preferences, generate a first outgoing message, and
    v) provide, to a first recipient computing device, the generated first outgoing message, wherein the first recipient computing device is associated with the first recipient, wherein receipt of the generated first outgoing message causes the first recipient computing device to (i) obtain a displayable message by rendering the generated first outgoing message and (ii) display, on a display of the first recipient computing device, the displayable message, wherein the plurality of application-specific message templates include a plurality of sets of application-specific message templates associated with a plurality of types of applications, respectively, and wherein each set of the plurality of sets of application-specific message templates is associated with (i) a different application than a remainder of the plurality of sets of application-specific message templates and (ii) a different set of languages than a remainder of the plurality of sets of application-specific message templates.

13. The computer system of claim 12, wherein the one or more processors further configured to:
  determine whether any of the plurality of message templates stored in the message template database are associated with the primary first language of the first recipient; and
  when a first particular message template of the plurality of message templates is associated with the primary first language of the first recipient, obtain the retrieved first message template by retrieving the first particular message template from the message template database.

14. The computer system of claim 13, wherein the one or more processors are further configured to, when (i) none of the plurality of message templates are associated with the primary first language of the first recipient and (ii) the one or more first languages understood by the first recipient include at least two first languages:
  determine a non-primary language of the first recipient by selecting another first language from the at least two first languages understood by the first recipient;
  determine whether any of the plurality of message templates stored in the message template database are associated with the non-primary language of the first recipient; and
  when a second particular message template of the plurality of message templates is associated with the non-primary language of the first recipient, obtain the retrieved first message template by retrieving the second particular message template from the message template database.

15. The computer system of claim 12, wherein,
  the request includes a message type identifier identifying a type of the outgoing message, and
  the plurality of message templates includes a set of message templates corresponding to the message type identifier, such that each message template in the set of message templates is in a different language relative to each other.

16. The computer system of claim 12, wherein the one or more first recipient preferences include at least one of a date format preference of the first recipient, a measurement unit preference of the first recipient, and a currency preference of the first recipient.

17. The computer system of claim 12, wherein:
  the one or more processors are configured to receive the request from a first application executing at the sender computing device, the first application being one of a plurality of different applications,
  each application of the plurality of different applications has a different set of message templates in the plurality of message templates corresponding thereto, and
  the retrieved first message template is retrieved further based on the first application executing at the sender computing device.

18. The computer system of claim 12, wherein the request indicates a plurality of recipients, wherein the plurality of recipients include the first recipient, and wherein each of a remainder of the plurality of message recipients has one or more recipient preferences corresponding thereto.

* * * * *